(12) United States Patent
Bialobrzeski et al.

(10) Patent No.: US 7,798,438 B1
(45) Date of Patent: Sep. 21, 2010

(54) MECHANICAL JIGGING BAIT CAST REEL

(76) Inventors: Walter Charles Bialobrzeski, 5026 E. Dallas St., Mesa, AZ (US) 85205;
Marilyn Borke Bialobrzeski, 5026 E. Dallas St., Mesa, AZ (US) 85205

( * ) Notice: Subject to any disclaimer, the term of this patent is extended or adjusted under 35 U.S.C. 154(b) by 0 days.

(21) Appl. No.: 12/387,906

(22) Filed: May 8, 2009

(51) Int. Cl.
*A01K 89/01* (2006.01)
(52) U.S. Cl. .................................... 242/249; 242/255
(58) Field of Classification Search ............. 242/249, 242/255, 257, 258, 260, 265, 266, 271, 322
See application file for complete search history.

(56) References Cited

U.S. PATENT DOCUMENTS

| | | | | |
|---|---|---|---|---|
| 4,830,308 A | * | 5/1989 | Puryear | 242/288 |
| 4,951,411 A | * | 8/1990 | Ecker | 43/19.2 |
| 5,344,098 A | * | 9/1994 | Roberts | 242/261 |
| 5,570,534 A | * | 11/1996 | Ford | 43/19.2 |
| 6,032,894 A | * | 3/2000 | Chapman et al. | 242/310 |
| 6,220,538 B1 | | 4/2001 | Durso | |
| 6,398,141 B1 | * | 6/2002 | Kim | 242/289 |
| 6,446,894 B1 | * | 9/2002 | Holma et al. | 242/249 |
| 7,188,795 B2 | * | 3/2007 | Maeder | 242/322 |
| 7,195,188 B2 | * | 3/2007 | Maeder | 242/322 |
| 7,438,248 B2 | * | 10/2008 | Tao | 242/246 |
| 2004/0031188 A1 | * | 2/2004 | Dugger | 43/44.91 |

* cited by examiner

*Primary Examiner*—Emmanuel M Marcelo

(57) ABSTRACT

The object of this invention is to mechanically jig a fish lure with a bait casting reel without using the fishing rod to jig the lure. Normally to jig a fish lure one must move the fishing rod either vertically, horizontally, or jerk the fishing line by hand. The jigging action of this bait cast reel (how rapid and how long in distance the jig will travel) will determine the desired intensity and resonance of the rattle used in the lure to attract fish. A jigging action in this fishing reel is accomplished by simply cranking the reel crank 14 on the jig reel.

8 Claims, 6 Drawing Sheets

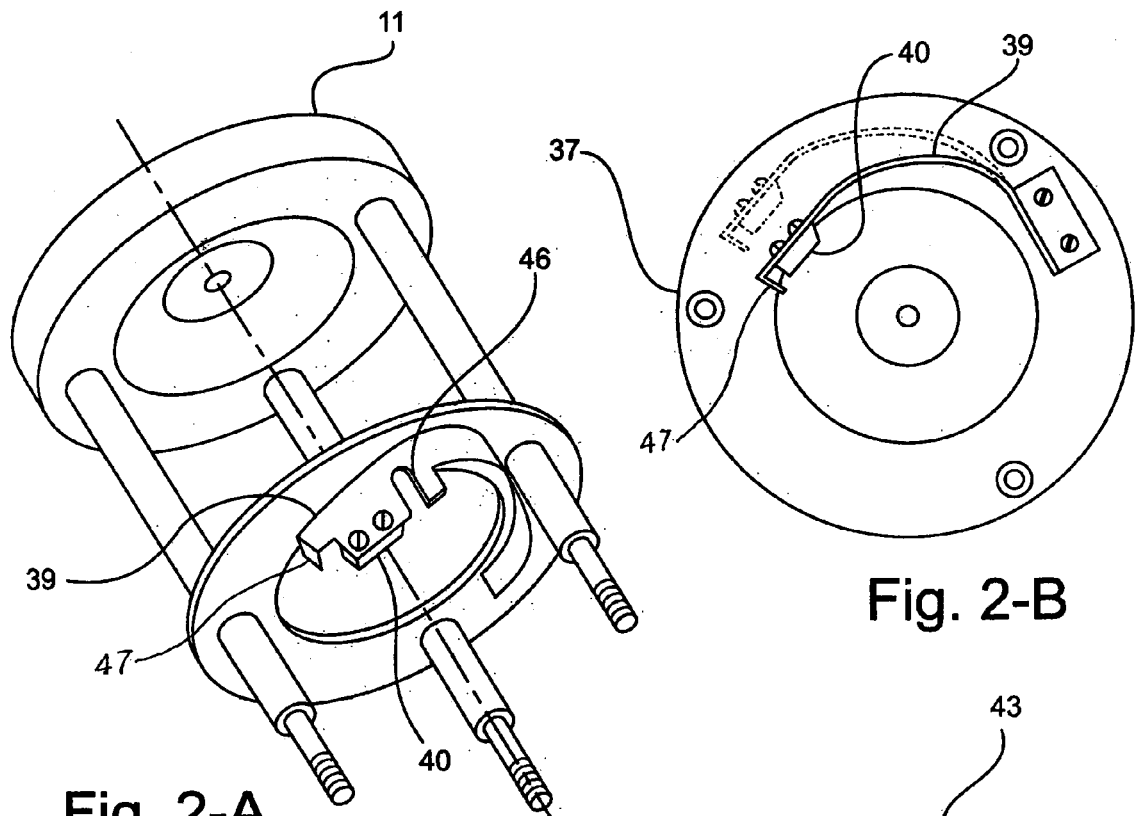
Fig. 2-A
Fig. 2-B
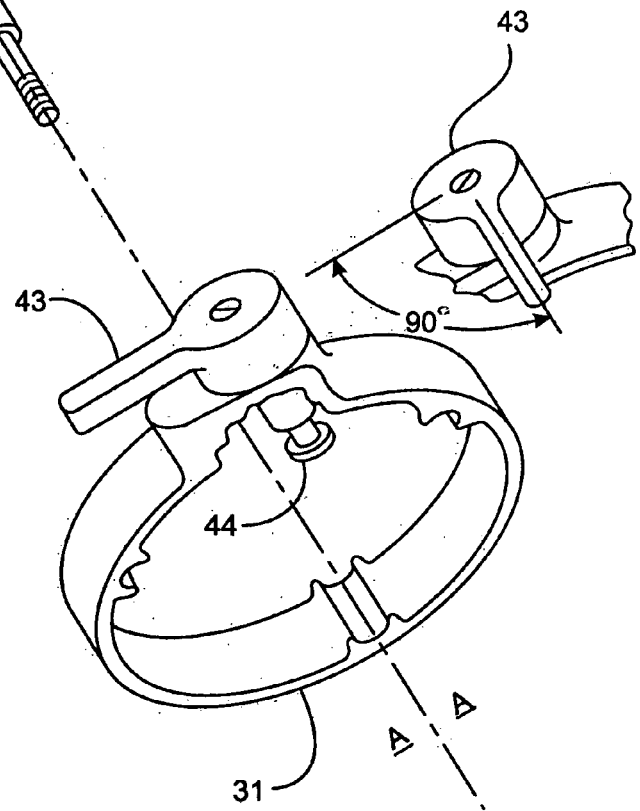
Fig. 3

MECHANICAL JIGGING BAIT CAST REEL

BACKGROUND

1. Field of Invention

This invention relates to a mechanical jigging mechanism for bait casting fishing reel.

2. Prior Art

To my knowledge, this bait cast reel possesses all the functions of all other current bait cast reels on the market. But the bait cast reels that are on the market today don't have a mechanical jigging function, as this jig reel has.

Many fish lures in today's market have rattles in them. The rattles in the lures are used to attract fish. A fisherman is always looking to do a jig in a short distance and make the rattle sound as loud as possible. The rapid rotation of pawl spring drive acetal housing assembly FIG. 1 is essential for increasing the volume of the rattle in the lure in order for the fish to hear it from a long distance. To jig a lure with a rattle and to use a fishing rod to make the rattle sound loud by wiping or jerking the rod would not accomplish as short a jig that this bait cast jig reel would.

U.S. Pat. No. 6,220,538 B1 to Durson discloses an electronic jig automating the reeling jigging of a fishing line. It functions along with display lights indicating the current status of the reel with fish bite indicators. The cost of this reel would not be affordable to many. A father wishing to buy his child a jigging bait cast reel would not start with an electronic one but rather with a mechanical one that would be cheaper and easy to use. This would be affordable, easy to use and fun for a child or adult.

I could not find any other bait cast reel that had any mechanical mechanism related to jigging a fish lure in the patent library or on the Internet.

DRAWINGS

Figures

In the drawings, closely related Figures have the same number but different alphabetic suffixes.

FIG. 1 shows the fishing reel with the jigging apparatus in accordance with one embodiment.

FIG. 2-A and 2-B show the reel structure and how pawl spring 39 is fastened to the reel with another embodiment FIG. 3 shows cover band 31 with lever 43 and shaft 44 for jigging or retrieving with another embodiment.

FIG. 4-A and 4-B shows how to assemble the pawl spring drive acetal housing with another embodiment.

Figure 1:
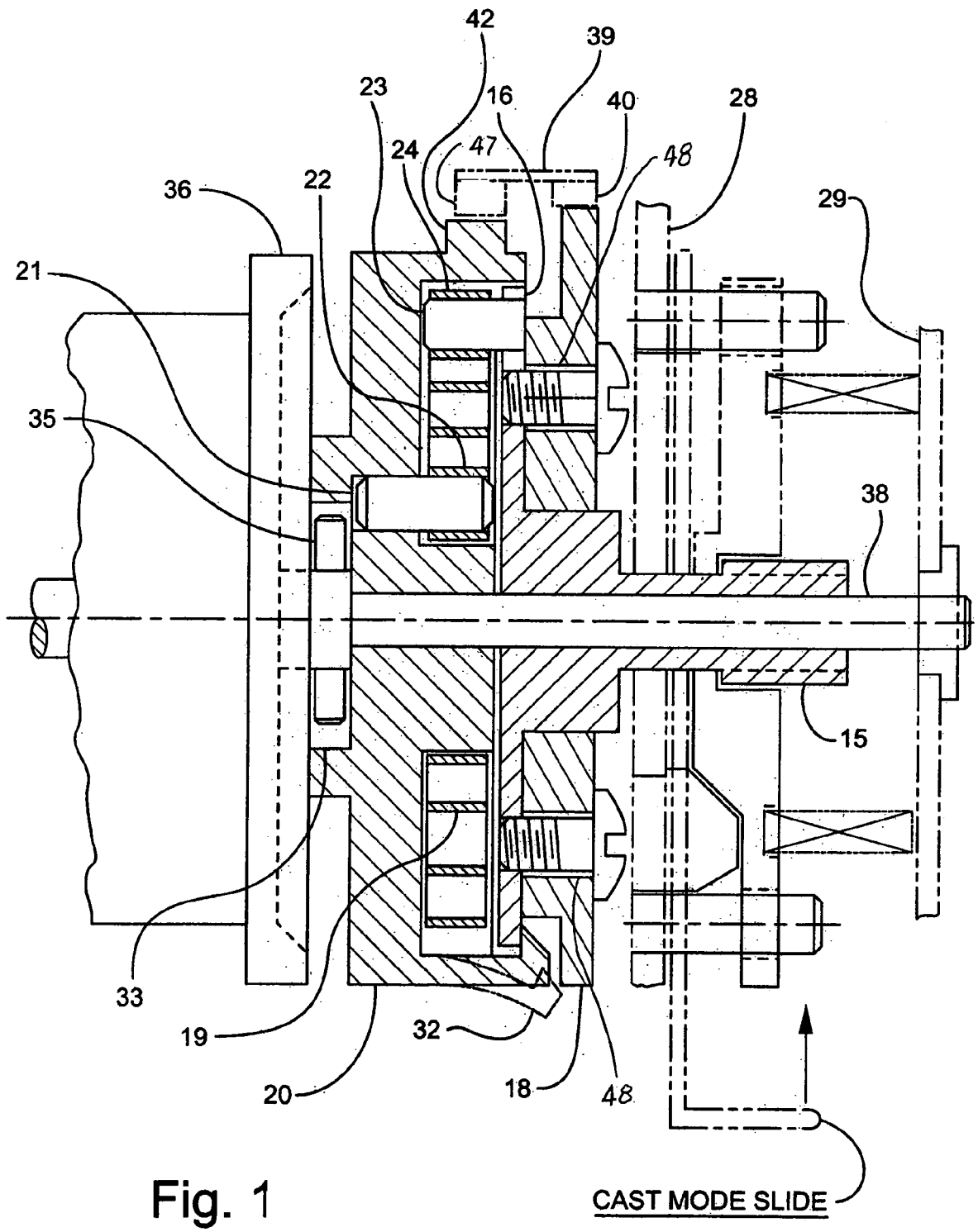

| DRAWINGS—Reference Numerals | |
|---|---|
| 11. | Reel Housing |
| 13. | Main Spiral Gear |
| 14. | Reel Crank |
| 15. | Pinion Spiral Gear |
| 16. | Spiral Spring Drive Plate |
| 18. | Adjustable Rotary Cam |
| 19. | Spiral Spring |
| 20. | Pawl Spring Drive Acetal Housing |
| 21. | Pin |
| 22. | Inner Loop |
| 23. | Spring Drive Pin |
| 24. | Outer Loop |
| 26. | Slotted Screws |
| 28. | Plate |
| 29. | Cover |
| 30. | Direction of the line Spool Jig |
| 31. | Cover Band |
| 32. | Acetal Springs |
| 33. | Pin Cage |
| 35. | Drive Pin |
| 36. | Line Spool |
| 37. | Reel Flange |
| 38. | Center Shaft |
| 39. | Pawl Spring |
| 40. | Cam Pad |
| 41. | Cam Lobe |
| 42. | Ratchet Step |
| 43. | Lever |
| 44. | Shaft |
| 46. | Slot |
| 47. | Pallet |
| 48. | Acruate Slots |

DETAILED DESCRIPTION

FIG. 1—Preferred Embodiment

Figure 5:
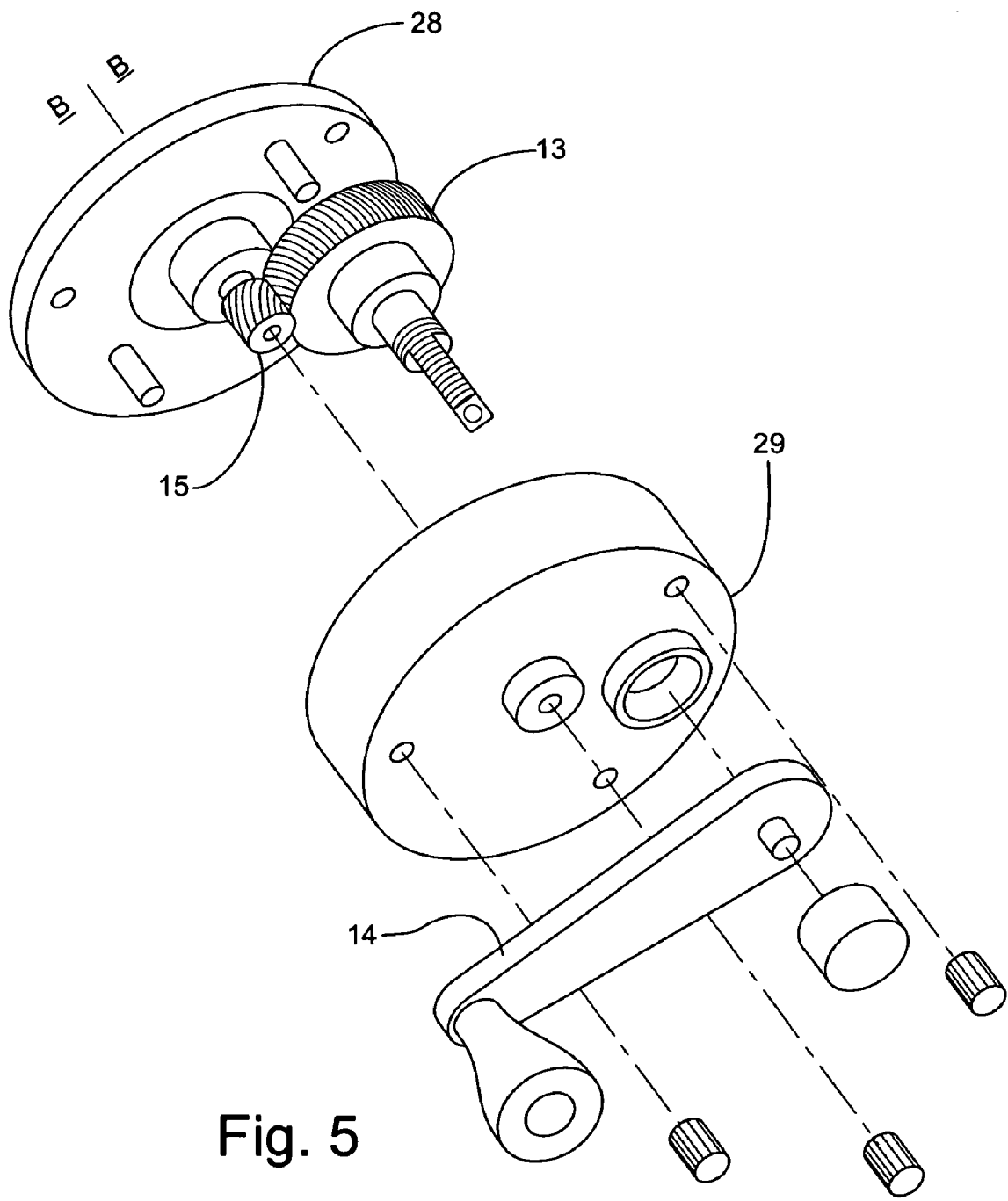
FIG. 5 shows gear ratio with another embodiment.

One embodiment on the jigging reel is illustrated in FIG. 1. A housing assembly FIG. 1 of a jigging bait cast fishing reel consists of four parts: spiral spring drive plate 16, spiral spring 19, pawl spring drive acetal housing 20, and adjustable rotary cam 18. Reel crank 14, which is connected to main spiral gear 13 and meshes with pinion spiral gear 15 in FIG. 5, is the main power drive for pawl spring drive acetal housing assembly as shown in FIG. 1. Spiral spring drive plate 16, rotary cam 18, spiral spring 19 and housing 20, shown in 2× scale, are part of FIG. 1 when assembled.

Figures 4A, 4B:
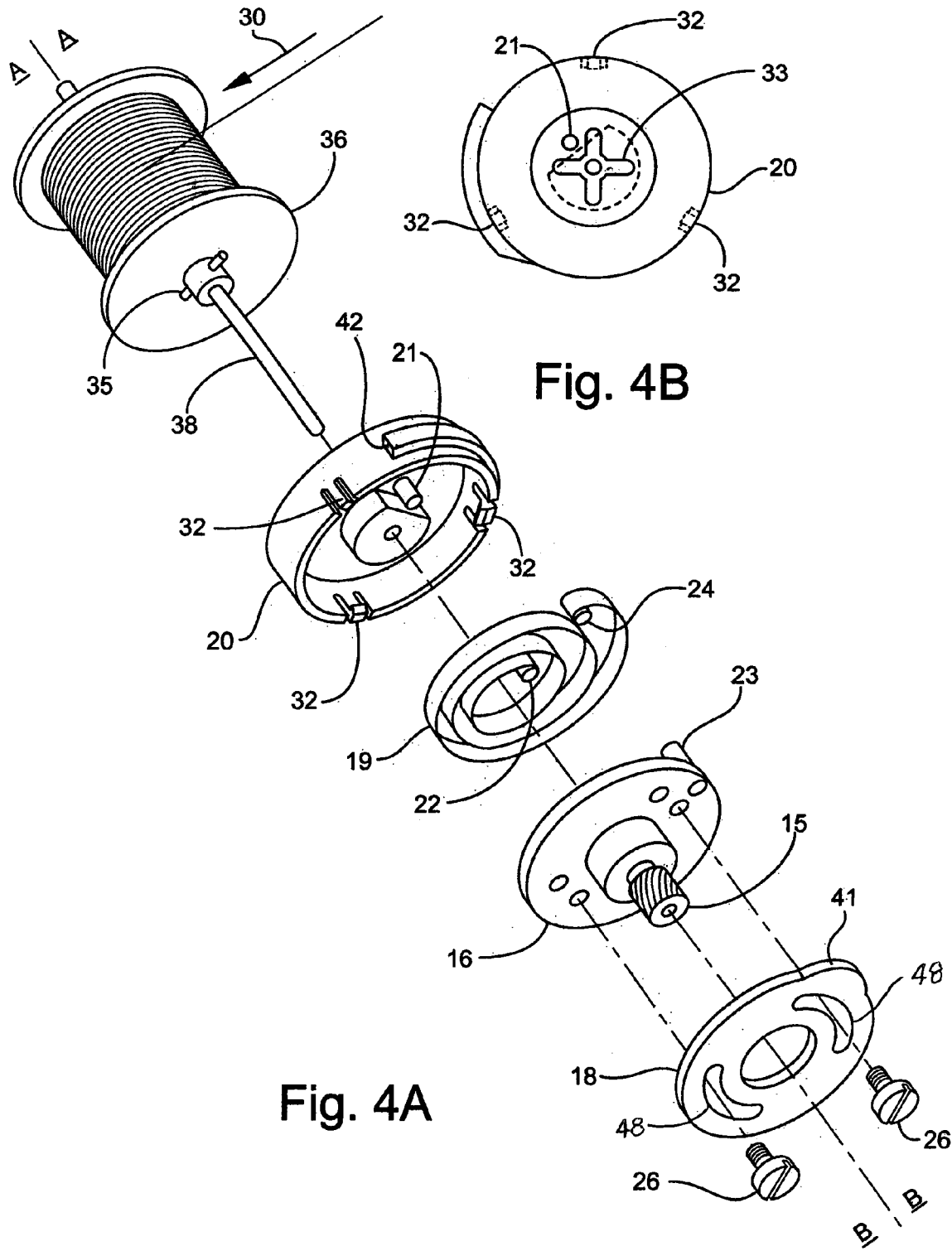

Housing 20 has a pin 21 pressed in the wall of the housing to accommodate inner loop 22 of the spiral spring 19. Spring drive pin 23, which is part of drive plate 16, accommodates outer loop 24 in spiral spring 19. As shown in FIG. 4-B, drive pin cage 33 is engaged over drive pin 35 on line spool 36. When assembling, line spool 36 goes into reel housing 11; housing assembly in FIG. 1 would then go on center shaft 38 and engage drive pin 35 in the pin cage 33.

In FIG. 1 housing assembly, there are the acetal springs 32 spaced 120 degrees apart on the outside diameter to accept spiral spring drive plate 16 as part of the unit of housing assembly shown in FIG. 1. Housing 20, which is made of acetal plastic (noted for its spring characteristics) is an ideal material to be used for a spring application. At present, I contemplate the use of acetal for the spring; other materials that would also be suitable. FIG. 1 shows how three springs 32 accept drive plate 16 into housing 20. Once assembled, drive plate 16 will turn freely so drive plate 16 can energize spiral spring 19.

Phantom portion in FIG. 1, not shown in detail, exists only to show how to disengage pin cage 33 from pin 35 so the fisherman can cast the lure.

Figure 6:
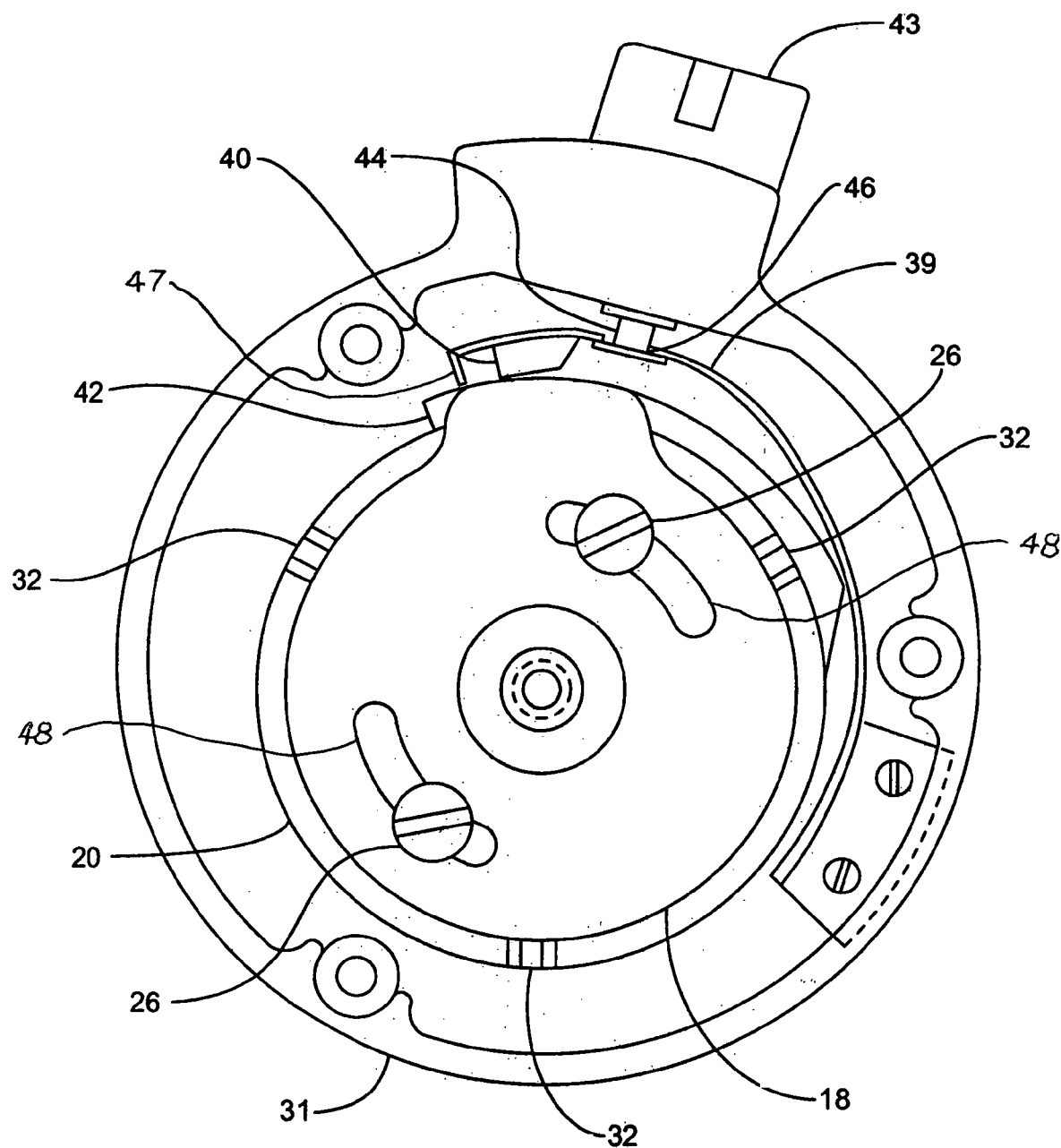
FIG. 6 shows the disengagement of pawl spring 39 with another embodiment.

In FIG. 2-A pawl spring 39 is fastened to reel flange 37 with screws. When assembled, pawl spring 39 will straddle housing 20. At this point, housing 20 is locked in position with line spool 36. When spring drive pin 23 is engaged in outer loop 24, it is free to wind and energize spiral spring 19 to whatever distance is set on adjustable rotary cam 18; this is what determines the length of the jig. Pawl spring 39 has a cam pad 40 affixed to it, as showing in FIG. 2-*b*, which comes in contact with cam lobe 41. Cam 18 then rotates in the direction of line spool jig 30, while lobe 41, on cam 18, rises pawl spring 39. Lobe 41 on cam 18 determines how much pallat 47 will rise to clear ratchet step 42. When the spiral spring 19 is energized in the housing assembly in FIG. 6 and FIG. 7 and released by pawl spring 39, housing 20 rotates rapidly to execute the jig on the line spool, as shown in FIG. 6 in direction 30 of FIG. 4-A.

Figure 7:
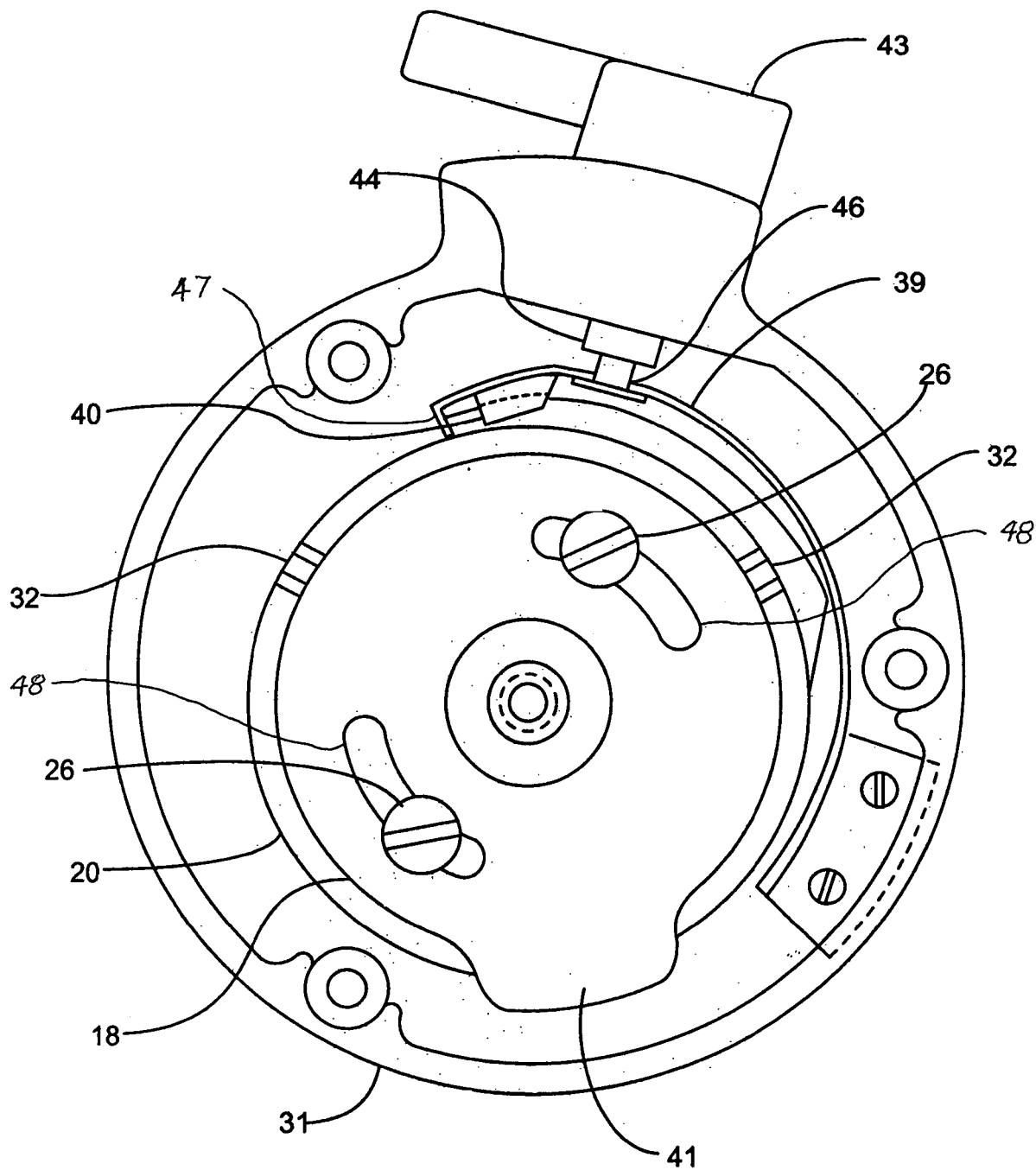
FIG. 7 shows the engagement of pawl spring 39 with another embodiment.

FIG. 3 shows cover band 31 with lever 43 in two positions 90 degrees apart. Lever 43 is used to engage or disengage the pawl spring 39 as shown in FIG. 6 and FIG. 7

FIG. 4-A and 4-B illustrates spiral spring 19, spiral spring drive plate 16, adjustable rotary can 18, and housing 20 to be assembled to make the housing assembly. The weight of the assembly is essential to provide momentum for a rapid spin of the reel spool; caused by the energy released from spiral spring 19

FIG. 5 shows main spiral gear 13 and pinion spiral gear 15 with a gear ratio of approximately five to one. Other Fish Bait cast reels on the market have varied gear ratios. This bait cast reel has been designed to make five jigs per one revolution on crank 14. Timing between each jig is a split second. This is an important factor for the fishermen to be able to jig his fish lure several times to a short distance in a short period of time as a small live bait would do.

FIG. 6 shows the disengagement of a ratchet step 42 on pawl spring 39 from housing 20 and the start of the jig after cam lobe 41 raises pawl spring 39 by engaging cam pad 40. The means of adjusting the length of a jig can be achieved by loosening slotted screws 26 and rotating rotary cam 18 one way or the other as shown in FIG. 6 and FIG. 7. It also shows the mounting of Pawl spring 39 to the flange of a fishing reel 37 in FIG. 2A. And it shows lever 43 in position to lift shaft 44 when engaged in slot 46 to hold pawl spring 39 in the up position. This frees assembly 20 to spin with the line spool 36 so that the fisherman can retrieve the lure. This retrieving mode applies to most bait cast reels on the market today.

FIG. 7 shows the engagement of pawl spring 39, housing 20, and adjustable rotary cam 18. A jigging mode will occur when shaft 44 is lowered; which engages slot 46 in pawl spring 39 and over housing 20. Slotted screws 26 shown in arcuate slots 48 are for adjusting rotary cam 18 to different lengths of the jig.

CONCLUSION, RAMIFICATIONS AND SCOPE

Accordingly, the reader will see that the jigging bait cast reel of the various embodiments can be used to mechanically cause the jigging mode. In addition, the jigging bait cast reel can go from jigging to a retrieve mode with just the flick of the lever 43.

Furthermore, the jigging reel has the additional advantages in that:

It permits the fisherman to constantly jig the fish lure without raising the end of the fishing rod. Because of the water resistance on the lure there is only a split second between the jigs. This means there is no slack in the line. When the fish inhales the lure the chance of hooking the fish are almost 100 percent because you don't have to set the hook with the rod.

It permits the jig to be in a variety of lengths. The person using the reel can also change the length of the jig; which can be changed when the fisherman disassembles the reel to do so It permits the change from jigging to retrieving to occur quickly and easily It permits any person who fishes, regardless of the ability level, to jig a lure with confidence.

I decided to make this improvement to a bait cast reel so that anyone of any age could fish using a jigging motion right from the reel. When I was eight years old, to go fishing meant using a drop line. However, with the jigging bait cast reel, my grandson, Zion, can jig a lure just like a professional Bass Pro fisherman.

Although the description above contains much specificity, these should not be construed as limiting the scope of the embodiment. They merely provide illustrations of some of the presently preferred embodiments. Thus, the scope of the embodiment should be determined by the appended claims and their legal equivalents, rather than by the examples given.

We claim:

1. A mechanical jigging function for a bait cast reel to go from casting or retrieving to jigging a fish lure comprising:
    a reel housing having an interior space;
    a reel, with a line spool with a center shaft, positioned substantially in said interior space;
    a reel crank attached to a main spiral gear engaged with a pinion spiral gear;
    a lever attached to a cover band which raises or lowers a shaft;
    a pawl spring with a pallet affixed to the reel housing and;
    a housing assembly positioned in said interior space in line with the center shaft comprising;
        a pawl spring drive acetal housing having a ratchet step;
        a spiral spring drive plate;
        a spiral spring;
        an adjustable rotary cam having a cam lobe with two arcuate slots having screws to adjust the rotary cam.

2. The jigging function of claim 1, wherein said spiral spring is energized by the winding of said reel crank which engages said main spiral gear engaging said pinion spiral gear.

3. The jigging function of claim 1, wherein said pawl spring releases the energized spiral spring by the use of said cam lobe, which raises said pawl spring to free said pallet from said ratchet step on said pawl spring drive acetal housing.

4. The jigging function of claim 1, wherein said pawl spring drive acetal housing rapidly propels said housing assembly, which is engaged with said line spool to initiate a fish lure attached to a fish line to jig.

5. The jigging function of claim 1, wherein said adjustable rotary cam by means of said cam lobe releases the energy in said spiral spring to produce a short rapid jig.

6. The jigging function of claim 1, wherein said lever when turned perpendicular or 90 degrees to said cover band raises said shaft in said cover band to disengage said pawl spring from contact with said ratchet step on said pawl spring acetal housing so that casting or retrieving can be accomplished.

7. The jigging function of claim 1, wherein said lever when turned parallel to said cover band lowers said shaft in the cover band to engage said pawl spring to come in contact with said ratchet step on said pawl spring acetal housing to allow a jigging action.

8. The jigging function of claim 1, wherein said adjustable rotary cam with two predetermined arcuate slots and two screws is used to either increase or decrease the length of the jig on said line spool of a bait cast reel.

* * * * *